United States Patent [19]

Ramirez-Soto

[11] Patent Number: 5,614,668
[45] Date of Patent: Mar. 25, 1997

[54] FUEL PRESSURE SENSING SYSTEM

[76] Inventor: Rufino Ramirez-Soto, 3400 Wright Ave., N. Las Vegas, Nev. 89030

[21] Appl. No.: 539,360

[22] Filed: Oct. 5, 1995

[51] Int. Cl.$^6$ ............................................. G01M 15/00
[52] U.S. Cl. ............................................. 73/119 A
[58] Field of Search ........................... 73/119 A, 119 R, 73/118.1

[56] References Cited

U.S. PATENT DOCUMENTS

| | | | |
|---|---|---|---|
| 4,211,119 | 7/1980 | Wolber | 73/721 |
| 4,506,545 | 3/1985 | Yamada et al. | 73/119 A |
| 5,148,792 | 9/1992 | Tuckey | 123/497 |
| 5,179,922 | 1/1993 | Bartholomew | 123/198 DR |
| 5,283,548 | 2/1994 | Kanno | 340/439 |
| 5,357,792 | 10/1994 | Getenby | 73/119 A |

OTHER PUBLICATIONS

J. C. Whitney catalog, p. 189, Nov. 1995.

*Primary Examiner*—Richard Chilcot
*Assistant Examiner*—George M. Dombroske
*Attorney, Agent, or Firm*—Joseph N. Breaux

[57] ABSTRACT

A fuel pressure sensing system is provided of the type for use with internal combustion engines. The fuel pressure sensing system comprises: a fuel injector for injecting fuel into at least one engine combustion chamber; a mechanism for supplying the fuel to the engine, the fuel supplying mechanism including a fuel line; a pressure sensor operationally connectable to the fuel line in a manner to sense and output a signal proportional to the pressure of the fuel passing through the fuel line; and an output device in functional connection with the pressure sensor for providing a visual display of the fuel pressure sensed.

5 Claims, 1 Drawing Sheet

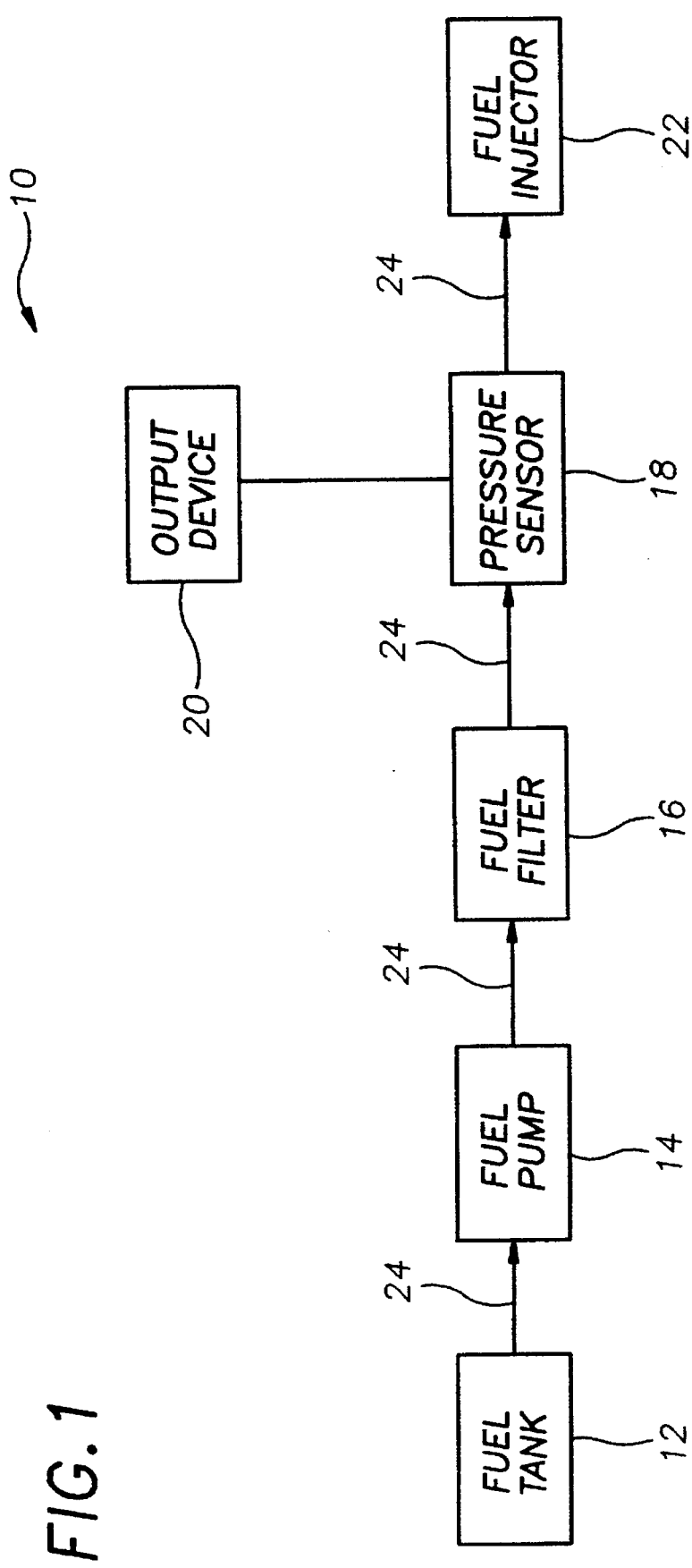

FUEL PRESSURE SENSING SYSTEM

TECHNICAL FIELD

The present invention relates to devices and methods for sensing fuel pressure and more particularly to devices and methods for sensing fuel pressure that visually displays the measured fuel pressure within the passenger compartment of a motor vehicle.

BACKGROUND ART

Modern vehicular fuel systems provide pressurized fuel from the fuel tank to the vehicle's engine. Generally, these fuel systems include a fuel pressure regulator to control the pressure of the fuel through the fuel system. In these pressurized systems many problems may arise when the fuel pressure drops below a specific operating pressure. Currently, a vehicle has to be taken to a mechanic for a series of tests before it can be determined if the source of the problem is insufficient fuel line pressure. Often, the vehicle is not taken to a mechanic until after time and money has been wasted trying to fix the problem at home.

It would be a benefit, therefore, to have a device that measures the fuel line pressure. It would be a further benefit, to have a device that measures the fuel line pressure immediately prior to the fuel injector. It would be an additional benefit, to have a device that visually displays the fuel line pressure within the passenger compartment of the vehicle.

GENERAL SUMMARY DISCUSSION OF INVENTION

It is thus an object of the invention to provide a fuel pressure sensing system that has a pressure sensor operationally connectable to a vehicle's fuel line.

It is a further object of the invention to provide a fuel pressure sensing system that has a pressure sensor operationally connectable to a vehicle's fuel line immediately prior to the fuel injector.

It is a still further object of the invention to provide a fuel pressure sensing system that has an outlet device functionally connected to the pressure sensor for visually displaying the fuel line pressure.

It is a still further object of the invention to provide a fuel pressure sensing system that has an outlet device functionally connected to the pressure sensor for visually displaying the fuel line pressure mounted within the passenger compartment of the vehicle.

Accordingly, a fuel pressure sensing system is provided of the type for use with internal combustion engines. The fuel pressure sensing system comprises: a fuel injector for injecting fuel into at least one engine combustion chamber; a mechanism for supplying the fuel to the engine, the fuel supplying mechanism including a fuel line; a pressure sensor operationally connectable to the fuel line in a manner to sense and output a signal proportional to the pressure of the fuel passing through the fuel line; and an output device in functional connection with the pressure sensor for providing a visual display of the fuel pressure sensed.

The fuel supplying mechanism may include a fuel pump and or a fuel filter. The fuel injector may be a fuel rail as used in fuel injection systems. The fuel injector may be a carburetor. Preferably, the pressure sensor is connectable between the fuel pump and the fuel injector. More preferably, the pressure sensor is connectable immediately before the fuel injector.

The output display may be any device known in the art for receiving the output signal from the pressure sensor and providing a visual display of the measured fuel pressure. The output device may be an analogue type pressure gauge. The output device may have a liquid crystal display.

In operation, fuel is pumped along the fuel line between the fuel tank and fuel injector. The pressure sensor measures the fuel pressure within the fuel line sending an output signal proportional to the fuel pressure to the output device mounted within the passenger compartment of the motor vehicle. The output device displays the fuel pressure to the operator of the vehicle.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a block diagram of an exemplary embodiment of the fuel pressure sensing system of the present invention.

EXEMPLARY MODE FOR CARRYING OUT THE INVENTION

FIG. 1 is a block diagram of an exemplary embodiment of the fuel pressure sensing system of the present invention generally designated by the numeral 10. Fuel pressure sensing system 10 includes a fuel tank 12, a fuel pump 14, a fuel filter 16, a pressure sensor 18, an output device 20 and a fuel injector 22.

Fuel injector 22 is a carburetor or fuel rail for injecting fuel into at least one engine combustion chamber (not shown). Fuel injector 22 is adapted to receive fuel from fuel tank 12 through pump 14 and a fuel filter 16. The fuel from fuel tank 12 flows in the direction of the arrows through a fuel line 24. Pressure sensor 18 is operationally connectable to fuel line 24 immediately before fuel injector 22 to give a more accurate reading of the fuel pressure at fuel injector 22.

Pressure sensor 18 is connectable to fuel line 24 in a manner to sense and output a signal proportional to the pressure of the fuel passing through fuel line 24. Output device 20 has an input in functional connection with the output signal of pressure sensor 18 for providing a visual display of the pressure of the fuel within fuel line 24. Output device 20 is mounted within the passenger compartment of the motor vehicle (not shown).

It can be seen from the preceding description that a method and device for sensing fuel pressure which has a pressure sensor operationally connectable to a vehicle's fuel line, has a pressure sensor operationally connectable to a vehicle's fuel line immediately prior to the fuel injector, has an outlet device functionally connected to the pressure sensor for visually displaying the fuel line pressure, and has an outlet device functionally connected to the pressure sensor for visually displaying the fuel line pressure mounted within the passenger compartment of the vehicle has been provided.

It is noted that the embodiment of the fuel pressure sensing system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fuel pressure sensing system comprising:

a fuel injector for injecting fuel into at least one engine combustion chamber;

means for supplying said fuel to said engine combustion chamber, said fuel supplying means including a fuel line;

a pressure sensor operationally connected to said fuel line at a location immediately before said fuel injector in a manner to sense and output a signal proportional to the pressure of the fuel passing through said fuel line at a location immediately prior to entering said fuel injector; and an output device mounted within a passenger compartment of a vehicle in functional connection with said pressure sensor for providing a visual display of said fuel pressure.

2. The fuel pressure sensing system of claim 1, wherein:

said fuel supplying means further includes:

a fuel tank;

a fuel pump; and a fuel filter.

3. The fuel pressure sensing system of claim 2, wherein:

said pressure sensor is connectable between said fuel pump and said fuel injector.

4. The fuel pressure sensing system of claim 3, wherein:

said fuel injector is a carburetor.

5. The fuel pressure sensing system of claim 3, wherein:

said fuel injector is a fuel rail.

* * * * *